US010057770B2

(12) United States Patent
Soundararajan

(10) Patent No.: US 10,057,770 B2
(45) Date of Patent: Aug. 21, 2018

(54) DEAUTHENTICATE A CLIENT DEVICE DURING AN ASSOCIATION VALIDATION PHASE BASED ON A PLURALITY OF CAPABILITIES ASSOCIATED WITH THE CLIENT DEVICE

(71) Applicant: ARUBA NETWORKS, INC., Sunnyvale, CA (US)

(72) Inventor: Abliash Soundararajan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 44 days.

(21) Appl. No.: 15/266,867

(22) Filed: Sep. 15, 2016

(65) Prior Publication Data

US 2018/0035292 A1 Feb. 1, 2018

(30) Foreign Application Priority Data

Jul. 28, 2016 (IN) .............................. 201641025908

(51) Int. Cl.
*H04L 29/06* (2006.01)
*H04W 12/06* (2009.01)
*H04W 48/04* (2009.01)
*H04W 84/12* (2009.01)

(52) U.S. Cl.
CPC ............. *H04W 12/06* (2013.01); *H04L 67/42* (2013.01); *H04W 48/04* (2013.01); *H04W 84/12* (2013.01)

(58) Field of Classification Search
CPC ...... H04W 12/06; H04W 48/04; H04W 84/12; H04L 67/42
See application file for complete search history.

(56) References Cited

U.S. PATENT DOCUMENTS

| 9,608,971 | B2 * | 3/2017 | Gronowski | H04L 63/062 |
| 2009/0228707 | A1 * | 9/2009 | Linsky | G06F 21/31 713/171 |
| 2014/0196127 | A1 * | 7/2014 | Smeets | H04L 63/0815 726/5 |
| 2016/0286169 | A1 * | 9/2016 | Sannala | H01Q 21/28 |
| 2016/0365885 | A1 * | 12/2016 | Honjo | H04B 1/38 |

* cited by examiner

*Primary Examiner* — Mahfuzur Rahman
(74) *Attorney, Agent, or Firm* — Hewlett Packard Enterprise Patent Department

(57) ABSTRACT

Certain implementations of the present disclosure relates to a method, device, and medium to perform association validation of a client device's request during an association validation phase based on a plurality of capabilities associated with the client device. The network device receives an association request to connect to a wireless network. Then, the network device extracts a parameter specific to the client device from the association request, and determines a plurality of capabilities associated with the client device based on a value of the parameter. Then, the network device transmits the plurality of capabilities to an authentication server during an association validation phase, and receives an association validation decision corresponding to the connection request from an association validation/authentication server. If the association validation decision indicates that the client device is denied access to the wireless network, the network device deauthenticates the client device during the association validation phase.

12 Claims, 6 Drawing Sheets

DEAUTHENTICATE A CLIENT DEVICE DURING AN ASSOCIATION VALIDATION PHASE BASED ON A PLURALITY OF CAPABILITIES ASSOCIATED WITH THE CLIENT DEVICE

BACKGROUND

There are many different kinds of wireless local area network (WLAN) client devices. These client devices could cross multiple generations of technologies with a variety of capabilities, WLAN authentications today are mostly based on user credentials. Generally, a WLAN infrastructure authenticates a client device and/or user, and then allow authorization based on the identity of the client device and/or user.

BRIEF DESCRIPTION OF THE DRAWINGS

The following detailed description references the drawings, wherein.

DETAILED DESCRIPTION

Today, many different kinds of wireless client devices, which vary from legacy wireless local area network (WLAN) client devices to IEEE 802.11ac wave-2 client devices, can all connect to the same WLAN on a particular service set identifier (SSID). As a result, the efficiency of the WLAN may be drastically impacted in a negative way. For example, features of improvements in the PHY level as well as MAC level cannot be fully utilized, because there is no established ways to prevent connections of legacy devices to the WLAN in a large scale.

Association validation servers/authentication servers support rule-based user authentication to the WLAN. However, existing authentication servers cannot process rules based on WLAN capabilities of a client device. According to the some implementations of the present disclosure, WLAN authentication can be based on a client device's support for a particular WLAN capability as specified by a network administrator.

Overview

Implementations of the present disclosure relates to network authentication management. In particular, example implementations of the present disclosure relates to deauthenticating a client device during an association validation phase based on a plurality of capabilities associated with the client device. With the solution provided herein, a network device receives a connection request to connect to a wireless network. Here, the connection request may include a first association request from a client device. Then, the network device extracts a parameter that is specific to the client device from the association request. Moreover, the network device determine a plurality of capabilities associated with the client device based on a value of the parameter. Then, the network device transmits the plurality of capabilities to an association validation server/authentication server during an association phase prior to an association validation phase. Next, the network device receives an association validation decision corresponding to the connection request from an association validation server/authentication server that compares the plurality of capabilities with a preconfigured wireless network attribute policy to make the association validation decision. In response to the association validation decision indicating that the client device is denied access to the wireless network, the network device deauthenticates the client device during the association validation phase.

Computing Environment

Figure 1:
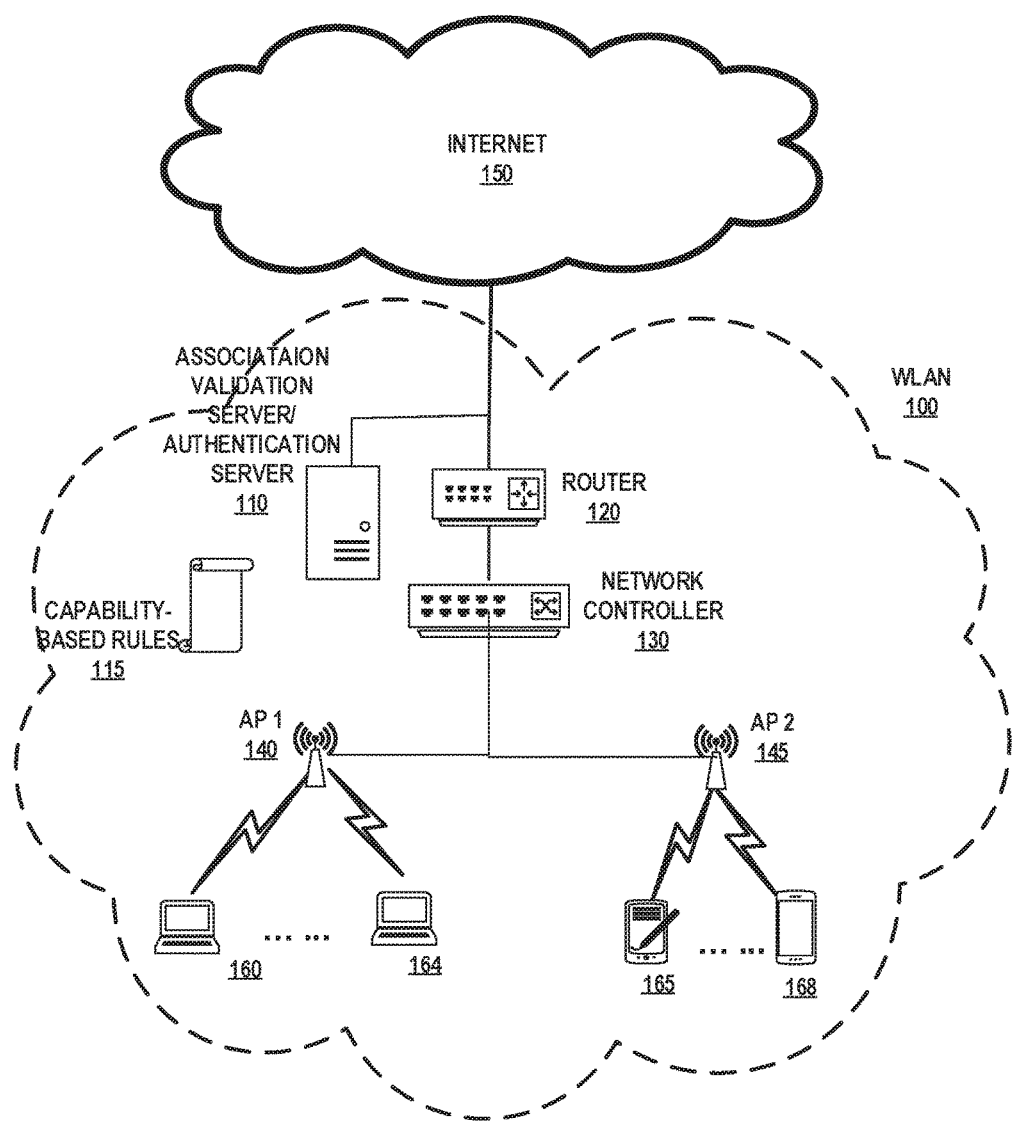
FIG. 1 is a block diagram of an example environment for deauthenticating a client device during an association validation phase based on a plurality of capabilities associated with the client device.

FIG. 1 is a block diagram of an example environment for deauthenticating a client device during an association validation phase based on a plurality of capabilities associated with the client device. FIG. 1 includes a router 120 in a wireless local area network (WLAN) 100. WLAN 100 is also connected to Internet 150. In this example, router 120 is connected to a network controller 130 and an association validation server/authentication server 110. Moreover, network controller 130 is connected to a plurality of access points, such as, AP1 140 and AP2 145. In some implementations, router 120 and network controller 1130 can be combined in a single network device in WLAN 100.

As used herein, "wireless local area network" (WLAN) generally refers to a communications network that links two or more devices using some wireless distribution mechanisms (for example, spread-spectrum or orthogonal frequency-division multiplexing radio). WLAN usually provides a connection through an access point to the Internet; and thus, providing users with the mobility to move around within a local coverage area and still stay connected to the network.

Network controller 130 is communicatively coupled with one or more access points, such as AP1 140 and AP2 145, to provide wireless network services to a number of wireless client devices, such as client devices 160-164 and client devices 165-168.

As used herein, "access point" (AP) generally refers to receiving points for any known or convenient wireless access technology which may later become known. Specifically, the term AP is not intended to be limited to IEEE 802.11-based APs. An AP generally functions as an electronic device that is adapted to allow wireless devices to connect to a wired network via various communication standards.

In addition, network depicted in FIG. 1 may include multiple network control plane devices, such as network controllers, switches, or routers capable of controlling networking functions. Each network control plane device may be located in a separate sub-network. The network control plane device may manage one or more network management devices, such as access points or network servers, within the sub-network.

In some implementations, network controllers support clustering and centralized management. For example, a master network controller can manage a number of local network controllers. The local network controllers collectively can support a large number of client devices in the WLAN at the same time.

For illustration purposes only, in the example network depicted in FIG. 1, a number of client devices are connected to the access points in WLAN 100. Specifically, client devices 160-164 are associated with AP1 140; and, client devices 165-168 are associated with AP2 145. Note that client devices may be connected to the access points via either wired or wireless connections.

As used herein, the term "link" or "connection" (or used descriptively as "connected") is generally defined as a communication pathway established over an information-carrying medium. The "link" or "connection" may be a wired interconnect, wherein the medium is a physical medium (e.g., electrical wire, optical fiber, cable, bus traces, etc.), a wireless interconnect (e.g., air in combination with wireless signaling technology), or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames, or cells.

Association validation server/authentication server 110 generally refers to an application server that facilitates authentication of an entity that attempts to access a wireless network. Note that association validation server and authentication server are used interchangeably throughout the disclosure to refer to a server that performs the action of association validation and/or authentication of client devices. Association validation server/authentication server 110 can reside in a dedicated computer, an Ethernet switch, an access point, or a network access server. In some implementations, association validation server/authentication server 110 supports Remote Authentication Dial-In User Service (RADIUS) protocol. RADIUS protocol generally refers to a client/server protocol that allows remote access servers to communicate with a central server to authenticate dial-in users and authorize their access to the requested system or service. For example, RADIUS allows a company to maintain user profiles in a central database that all remote servers can share. The company can set up a policy that can be applied at a single administered network point.

According to some implementations of the present disclosure, one example of such policy may be a set of client capability based rules 115. For example, when a customer wants to ensure that only client devices capable of fast roaming in accordance with IEEE 802.11r are allowed to connect to a first SSID (e.g., the SSID associated with AP1 140), a network administrator can configure the association validation server/authentication server to enforce a client capability-based authentication rule 115 that only allows client devices that are compatible with IEEE 802.11r to connect to the first SSID associated with AP1 140. As another example, when a customer wants to ensure that only client devices having capabilities that are compatible with IEEE 802.11ac or 802.11n can connect to a second SSID (e.g., the SSID associated with AP2 145), the network administrator can configure the association validation server/authentication server to enforce a client capability-based authentication rule 115 that only allows client devices that are compatible with IEEE 802.11ac or 802.11n to connect to the second SSID associated with AP2 145. Likewise, the network administrator can configure a particular SSID to be completely 802.11k enabled in a client capability-based authentication rule 115, such that all client devices connecting to the particular SSID support IEEE 802.11k capabilities.

Client Capability Based WLAN Authentication

Figure 2:
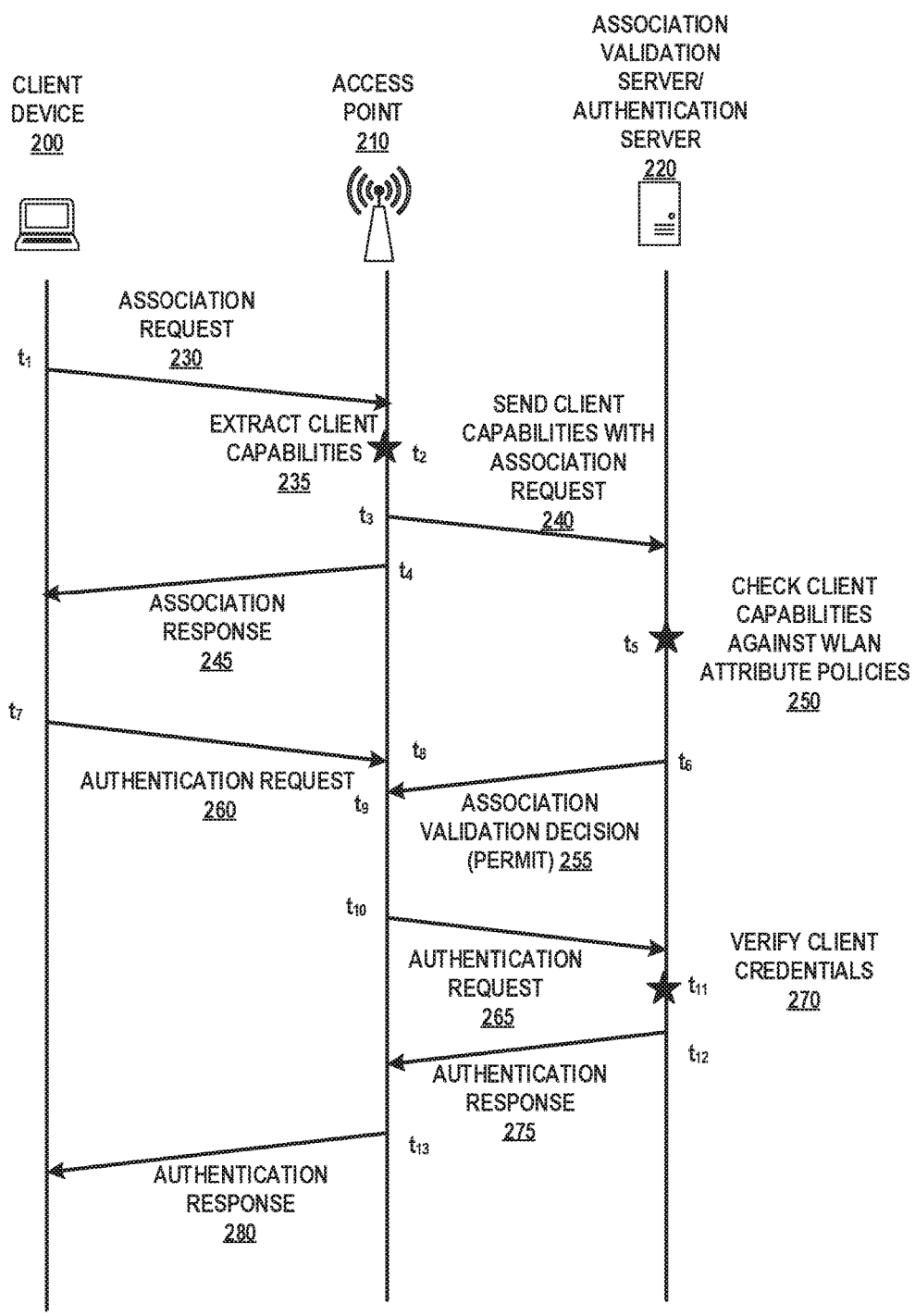
FIG. 2 is a sequence diagram of example communication exchanges for deauthenticating a client device during an association validation phase based on a plurality of capabilities associated with the client device.

FIG. 2 is a sequence diagram of example communication exchanges for deauthenticating a client device during an association validation phase based on a plurality of capabilities associated with the client device. FIG. 2 includes a client device 200, an access point 210 that client device 200 attempts to be associated with, and an association validation server/authentication server 220 that authenticates clients to a WLAN that includes access point 210. As illustrated in FIG. 2, at time point $t_1$, client device 200 sends an association request 230 to access point 210. For example, association request 230 may include an association request message.

Next, at time point $t_2$, access point 210 can extract client capabilities 235 from received association request 230. In the association request message, client device 200 will advertise the capabilities of the client devices. These capabilities include, for example, basic rate and transmit rate supported by client device 200, fast roaming capabilities, beamforming capabilities, neighbor report capabilities, etc.

Then, at time point $t_3$, access point 210 will send client capability information along with association request 240 to association validation server/authentication server 220. Meanwhile, at time point $t_4$, access point 210 may send an association response 245 in reply to association request 230. Association response 245 may indicate a success. However, it shall be noted that the association successful response received during the association phase is temporary and subject to be validated later in the association validation phase.

When client device 200 receives association response 245, client device 200 transitions from an association phase to an association validation phase. During the association validation phase, client device 200 transmits an authentication request 260 at time point $t_7$. Authentication request 260 is received by access point 210 at time point $t_8$ and will be forwarded to association validation server/authentication server 220 subsequently.

At time point $t_5$, upon receiving client capabilities for client device 200, association validation server/authentication server 220 will check the client capabilities against a set of preconfigured WLAN attribute policies 250. For example, such WLAN attribute policies may indicate that client devices shall support IEEE 802.11r fast BSS transition capabilities in or der to connect to access point 210 in the WLAN. As another example, the WLAN attribute policies may allow only client devices that support Transmit Beamforming (e.g., high throughput (HT) capabilities) to connect to access point 210. In yet another example, the WLAN attribute policies may allow only client devices that support IEEE 802.11k neighbor report element to connect to access point 210. In some implementations, the WLAN attribute policies allow only client devices that support IEEE 802.11ac with minimum supported MCS rates to connect to access point 210. In some implementations, the WLAN attribute policies allow client devices to connect to access point 210 only if they support both IEEE 802.11n and IEEE 802.11h capabilities (e.g., HT capabilities & TPC element).

The above examples are given for illustration purposes only. In some implementations, access point 210 can extract client capability information from an information element in association request 230. Specifically, access point 210 may extract any of the following fields from the information element of association request 230: an SSID element, a supported rates element, an FH parameter set element, a DSSS parameter set element, a CF parameter set element, a TIM element, an IBSS parameter set element, a challenge text element, a country element, a hopping pattern parameters element, a hopping pattern table element, a request element, an ERP element, an extended supported rates element, a power constraint element, a power capability element, a TPC request element, a TPC report element, a supported channels element, a channel switch announcement element, a secondary channel offset element, a measurement request element, a measurement report element, a quiet element, an IBSS DFS element, a RSNE, a vendor specific element, an extended Capabilities element, a BSS Load element, an EDCA parameter set element, a TSPEC element, a TCLAS element, a TS Delay element, a TCLAS processing element, a schedule element, a QoS Capability element, an AP channel report element, a neighbor report element, a RCPI element, a BSS average access delay element, an antenna element, a RSNI element, a measurement pilot transmission element, a BSS available admission capacity element, a BSS AC access delay element, a RM enabled capabilities element, a multiple BSSID element, a mobility domain element (MDE), a fast BSS Transition element (FTE), a timeout interval element (TIE), a RIC data element (RDE), a RIC descriptor element, a DSE registered location element, an extended channel switch announcement element, a supported operating classes element, a management MIC element, a HT capabilities element, a HT operation element, a BSS intolerant channel report element, an overlapping BSS scan parameters element, a BSS coexistence element, a time advertisement element, a link identifier element, a wakeup schedule element, a channel switch timing element, a PTI control element, a TPU buffer status element, an event request element, a diagnostic request element, a diagnostic report element, an event report element, a location parameters element, a non-transmitted BSSID capability element, an SSID list element, a multiple BSSID-Index element, an FMS descriptor element, an FMS request element, an FMS response element, a QoS traffic capability element, a BSS max idle period element, a TFS request element, a TFS response element, a WNM-Sleep mode element, a TIM broadcast request element, a TIM broadcast response element, a collocated interference Report element, a channel usage element, a time zone element, a DMS request element, a DMS response element, a destination URI element, a U-APSD coexistence element, an interworking element, an advertisement protocol element, an expedited bandwidth request element, a QoS map set element, a roaming consortium element, an emergency alert identifier element, a mesh configuration element, a mesh ID element, a mesh link metric report element, a congestion notification element, a mesh peering management element, a mesh channel switch parameters element, a mesh awake window element, a beacon timing element, a MCCAOP setup request element, a MCCAOP setup reply element, a MCCAOP advertisement overview element, a MCCAOP advertisement element, a MCCAOP teardown element, a GANN element, a RANN element, a PREQ element, a PREP element, a PERR element, a PXU element, a PXUC element, an authenticated mesh peering exchange element, a MIC element, a VHT capabilities element, a VHT operation element, an extended BSS load element, a wide bandwidth channel switch element, a VHT transmit power envelope element, a channel switch wrapper element, an AID element, a quiet channel element, an operating mode notification element, an access network query protocol (ANQP) elements, a query list ANQP-element, a capability list ANQP-element, a venue name ANQP-element, an emergency call number ANQP-element, a network authentication type ANQP-element, a roaming consortium ANQP-element, a vendor specific ANQP-element, an IP address type availability ANQP-element, an NAI realm ANQP-element, a 3GPP cellular network ANQP-element, an AP geospatial location ANQP-element, an AP civic location ANQP-element, an AP location public identifier URI ANQP-element, a domain name ANQP-element, an emergency alert URI ANQP-element, an emergency NAI ANQP-element, a TDLS capability ANQP-element, a neighbor report ANQP-element, etc.

In some implementations, access point 210 can extract client capability information from a non-IE field in association request 230. Specifically, access point 210 may extract the following fields from association request 230: an authentication algorithm number field, an authentication transaction sequence number field, a beacon interval field, a capability information field, a current AP address field, a listen interval field, a reason code field, an AID field, a status code field, a timestamp field, an action field, a dialog token field, a DLS timeout value field, a block acknowledgement parameter set field, a block acknowledgment timeout value field, a DELBA parameter set field, a QoS info field, a measurement pilot interval field, a max transmit power field, a transmit power used field, a channel width field, a SM power control field, a PCO phase control field, a PSMP parameter set field, a PSMP station information field, a MIMO control field, a CSI report field, a non-compressed beamforming report field, a compressed beamforming report field, an antenna selection indices field, an organization identifier field, a rate identification field, a GAS query response fragment identifier field, a venue information field, a target channel field, an operating class field, a send-confirm field, an anti-clogging token field, a scalar field, an element field, a confirm field, a finite cyclic group field, etc.

Once association validation server/authentication server 220 checks the client capabilities against a set of preconfigured WLAN attribute policies 250, association validation server/authentication server 220 will make an association validation decision. In the example in FIG. 2, association validation server/authentication server 220 determines that client device 200 has the capabilities necessary to associate with access point 210. Therefore, at time point $t_6$, association validation server/authentication server 220 sends an association validation decision 255 to access point 210. Here, association validation decision 255 indicates that client device 200 is permitted to connect to access point 210.

At time point $t_9$, access point 210 receives association validation decision. Because client device 200 is permitted to connect to access point 210, access point 210 will forward authentication request 265 to association validation server/authentication server 220 at time point $t_{10}$. Authentication request 265 includes, for example, client credentials for logging on to the WLAN. At time point $t_{11}$, association validation server/authentication server 220 verifies client credentials 270. Thereafter, at time point $t_{12}$, association validation server/authentication server 220 transmits an authentication response 275 to access point 210, which will forward authentication response 280 to client device 200 at time point $t_{13}$.

Figure 3:
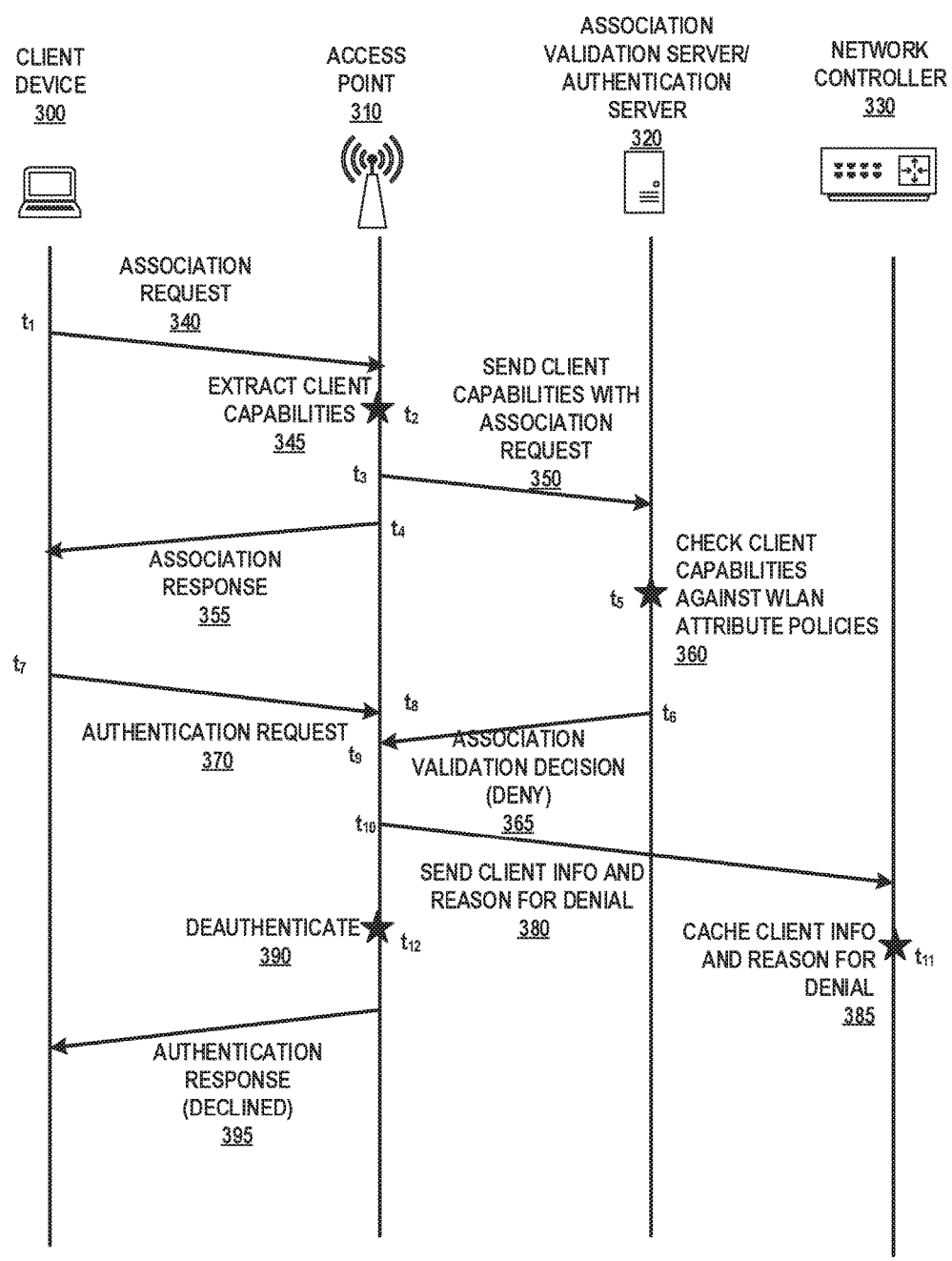
FIG. 3 is a sequence diagram of example communication exchanges for deauthenticating a client device during an association validation phase based on a plurality of capabilities associated with the client device.

FIG. 3 is a sequence diagram of example communication exchanges for deauthenticating a client device during an association validation phase based on a plurality of capabilities associated with the client device. FIG. 3 includes a client device 300, an access point 310 that client device 300 attempts to be associated with, an association validation server/authentication server 320 that authenticates clients to a WLAN that includes access point 310, and a network controller 330 that manages access points in the WLAN (including access point 310).

As illustrated in FIG. 3, at time point client device 300 sends an association request 340 to access point 310. For example, association request 340 may include an association request message. Next, at time point $t_2$, access point 310 can extract client capabilities 345 from received association request 340. In the association request message, client device 300 will advertise its capabilities, including but not limited to, basic rate and transmit rate supported by client device 200, fast roaming capabilities, beamforming capabilities, neighbor report capabilities, etc.

Then, at time point $t_3$, access point 310 will send client capability information along with association request 350 to association validation server/authentication server 320. Meanwhile, at time point $t_4$, access point 310 may send an association response 355 in reply to association request 340. Association response 355 may indicate a success. However, the association successful response received during the association phase is temporary and subject to be validated later in the association validation phase.

When client device 300 receives association response 355, client device 300 transitions from an association phase to an association validation phase. During the association validation phase, client device 300 transmits an authentication request 370 at time point $t_7$. Authentication request 370 is received by access point 310 at time point $t_8$.

On the other hand, at time point $t_5$, upon receiving client capabilities for client device 300, association validation server/authentication server 320 will check the client capabilities against a set of preconfigured WLAN attribute policies 360. For example, such WLAN attribute policies may indicate that client devices shall support IEEE 802.11r fast BSS transition capabilities in order to connect to access point 310 in the WLAN. As another example, the WLAN attribute policies may allow only client devices that support Transmit Beamforming (e.g., high throughput (HT) capabilities) to connect to access point 310. In yet another example, the WLAN attribute policies may allow only client devices that support IEEE 802.11k neighbor report element to connect to access point 310. In some implementations, the WLAN attribute policies allow only client devices that support IEEE 802.11ac with minimum supported MCS rates to connect to access point 310. In some implementations, the WLAN attribute policies allow client devices to connect to access point 310 only if they support both IEEE 802.11n and IEEE 802.11h capabilities (e.g., HT capabilities & TPC element).

Once association validation server/authentication server 320 checks the client capabilities against a set of preconfigured WLAN attribute policies 360, association validation server/authentication server 320 will make an association validation decision. In the example in FIG. 3, association validation server/authentication server 320 determines that client device 300 does not have the capabilities necessary to associate with access point 310. Therefore, at time point $t_6$, association validation server/authentication server 320 sends an association validation decision 365 to access point 310. Here, association validation decision 365 indicates that client device 300 is denied access to access point 310. Moreover, association validation decision 365 may also include a reason code. Specifically, the reason code may be a reserved reason code indicating a reason for denial of access by the client device to the wireless network. In some implementations, the reason code has a customized value of 245.

When access point 310 receives association validation decision 365, access point 310 determines a reason for denial based on the received association validation decision, and sends the client information (e.g., an identifier uniquely corresponding to client device 300 such as a MAC address) and the reason for denial to network controller 330 at time point $t_{10}$. Network controller 330 caches the identifier and the reason for a predetermined period of time 385 at time point $t_{11}$. Note that during the predetermined period of time, connection requests from client device 300 to the same SSID are denied by the network device without forwarding to association validation server/authentication server 320.

As previously mentioned, at time point $t_8$, access point 310 receives authentication request 370 from client device 300. Authentication request 265 includes, for example, client credentials for logging on to the WLAN. Subsequently, at time point $t_9$, access point 310 receives association validation decision 365. Because client device 300 is denied access to access point 310, access point 310 will deauthenticate 390 client device 300 at time point $t_{12}$, and then immediately sends an authentication response 395 to client device 300, indicating that authentication is failed for client device 300. In some implementations, authentication response 395 optionally includes a specific reason for denial, e.g., a particular capability that client device 300 does not have but is required for connecting to access point 310.

Processes to Deauthenticate a Client Device Based on Client Capabilities

Figure 4:
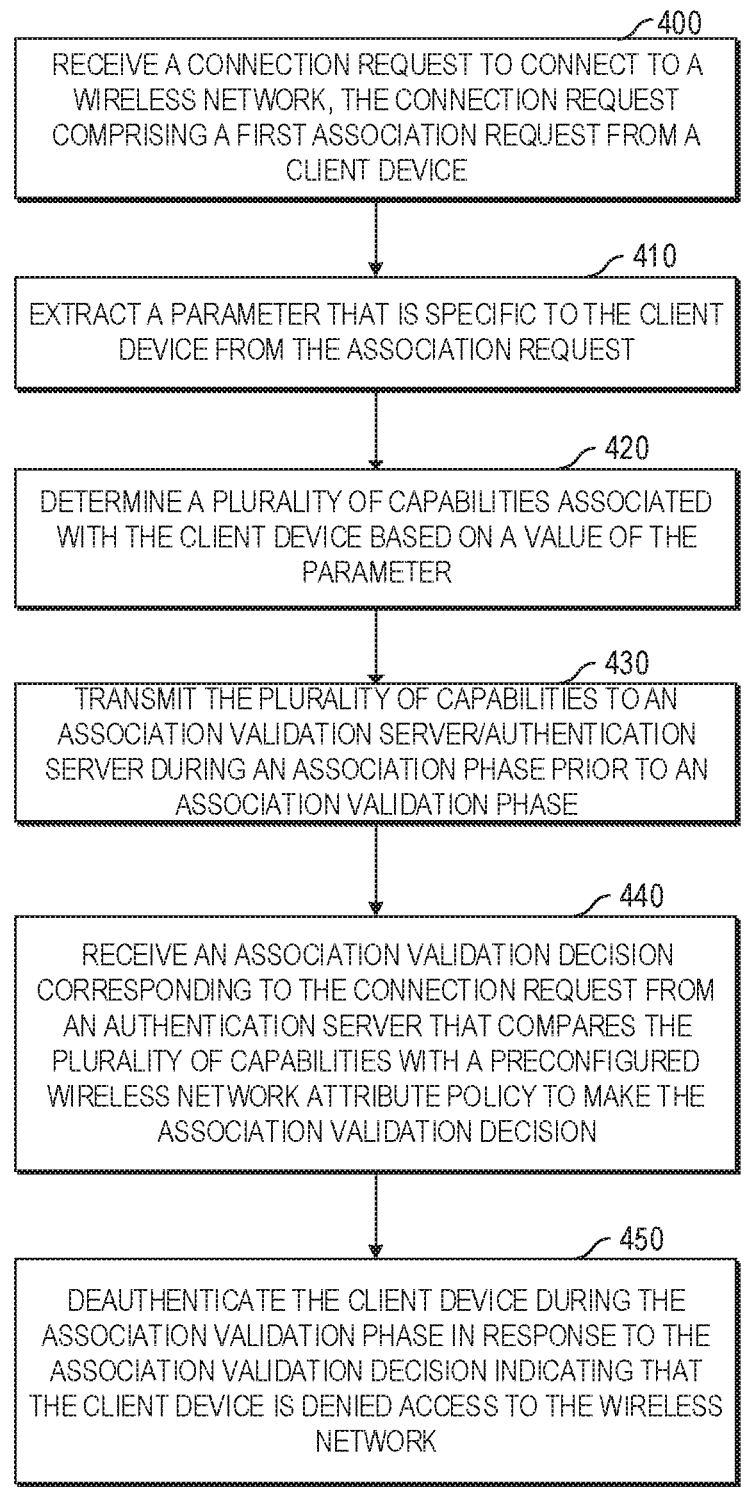
FIG. 4 is a flowchart of an example process to deauthenticate a client device during an association validation phase based on a plurality of capabilities associated with the client device.
Figure 5:
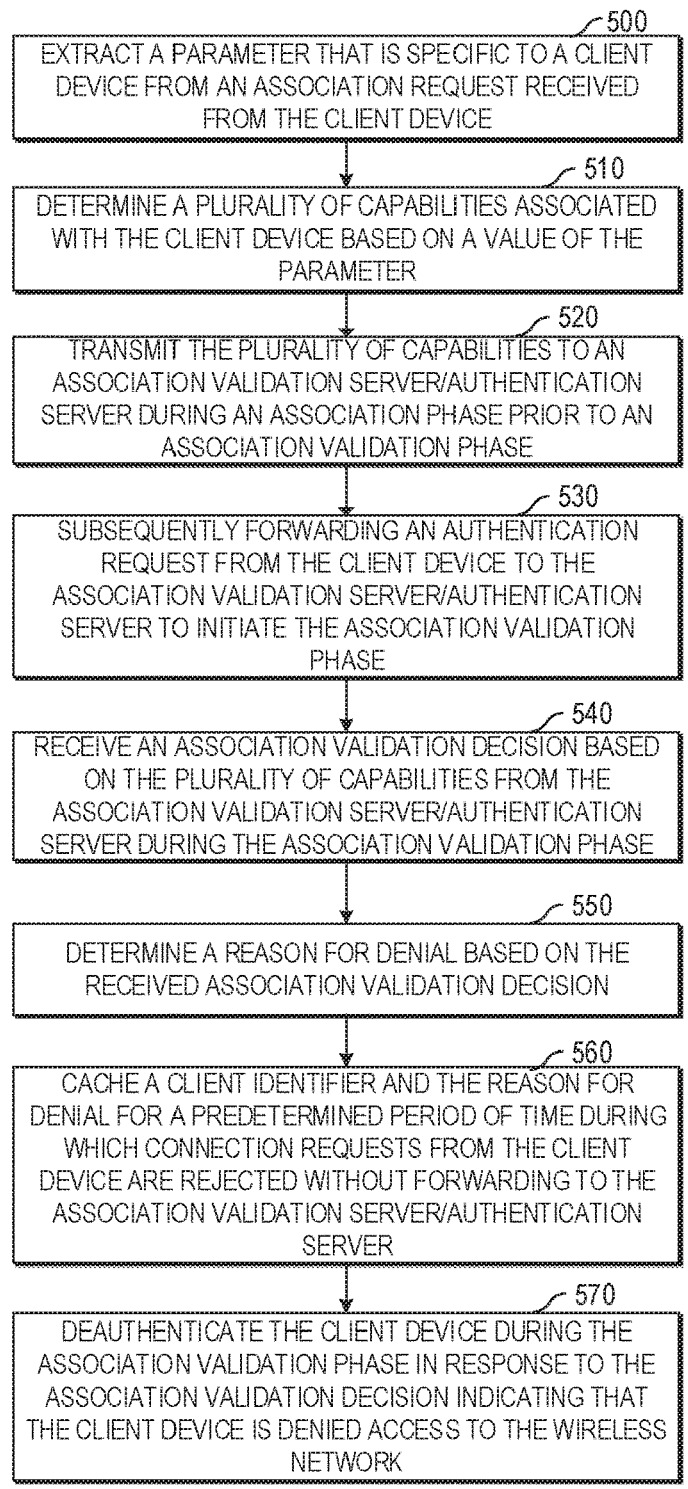
FIG. 5 is a flowchart of an example process to deauthenticate a client device during an association validation phase based on a plurality of capabilities associated with the client device.

In discussing FIGS. 4-5, references may be made to the components in FIGS. 1-3 to provide contextual examples. In one implementation, access points (such as, AP1 140 and AP2 145) as in FIG. 1 executes operations 410-450 to deauthenticate a client device during an association validation phase based on capabilities associated with the client device. In one implementation, access points (such as, AP1 140 and AP2 145) as in FIG. 1 executes operations 510-570 to deauthenticate a client device during an association validation phase based on capabilities associated with the client device. Further, although FIGS. 4-5 are described as implemented by a network device, it may be executed on other suitable components. For example, FIGS. 4-5 may be implemented in the form of executable instructions on a machine-readable storage medium 620 as in FIG. 6.

FIG. 4 is a flowchart of an example process to deauthenticate a client device during an association validation phase based on capabilities associated with the client device. First, a network device receives a connection request to connect to a wireless network (operation 400). Specifically, the connection request includes a first association request from a client device.

Then, the network device extracts a parameter that is specific to the client device from the association request (operation 410). In some implementations, the parameter is extracted from an information element of the association request. In other implementations, the parameter is extracted from a non-IE field of the association request.

Next, the network device determines a plurality of capabilities associated with the client device based on a value of the parameter (operation 420). In some examples, the plurality of capabilities include the client device's support for fast basic service set (BSS) transition based roaming in the wireless network. In some examples, the plurality of capabilities include the client device's support for assisted roaming based on a neighbor list. In some examples, the plurality of capabilities comprise the client device's support for beamforming. Moreover, the network device transmits the plurality of capabilities to an association validation server/authentication server during an association phase prior to an association validation phase (operation 430).

Thereafter, the network device receives an association validation decision corresponding to the connection request from an association validation server/authentication server (operation 440). In particular, the association validation server/authentication server compares the plurality of capabilities with a preconfigured wireless network attribute policy to make the association validation decision. Note that the association validation decision may include a reserved reason code indicating a reason for denial of access by the client device to the wireless network.

In response to the association validation decision indicating that the client device is denied access to the wireless network, the network device deauthenticates the client device during the association validation phase (operation 450). In some implementations, the network device further determines a reason for denial based on the received association validation decision, and transmits an identifier corresponding to the client device and the reason for denial to a network controller. The network controller can then cache the identifier and the reason for a predetermined period of time, during which connection requests from the client device are denied by the network device without forwarding to the association validation server/authentication server.

FIG. 5 is a flowchart of an example process to deauthenticate a client device during an association validation phase based on capabilities associated with the client device. Specifically, a network device (e.g., an access point) may extract a parameter that is specific to a client device from an association request received from the client device (operation 500). Then, the access point can determine a plurality of capabilities associated with the client device based on a value of the parameter (operation 510). Next, the access point transmits the plurality of capabilities to an association validation server/authentication server during an association phase prior to an association validation phase (operation 520). Subsequently, the access point forwards an authentication request from the client device to the association validation server/authentication server to initiate the association validation phase (operation 530). Moreover, the access point receives an association validation decision based on the plurality of capabilities from the association validation server/authentication server during the association validation phase (operation 540). Then, the access point determines a reason for denial based on the received association validation decision (operation 550). Moreover, the access point (or a network controller, or another network storage device in the WLAN) may cache a client identifier and the reason for denial for a predetermined period of time during which connection requests from the client device are rejected without forwarding to the association validation server/authentication server (operation 560). Thereafter, the access point will deauthenticates the client device during the association validation phase in response to the association validation decision indicating that the client device is denied access to the wireless network based on the plurality of capabilities (operation 570).

Network Device to Deauthenticate a Client Device Based on Client Capabilities

Figure 6:
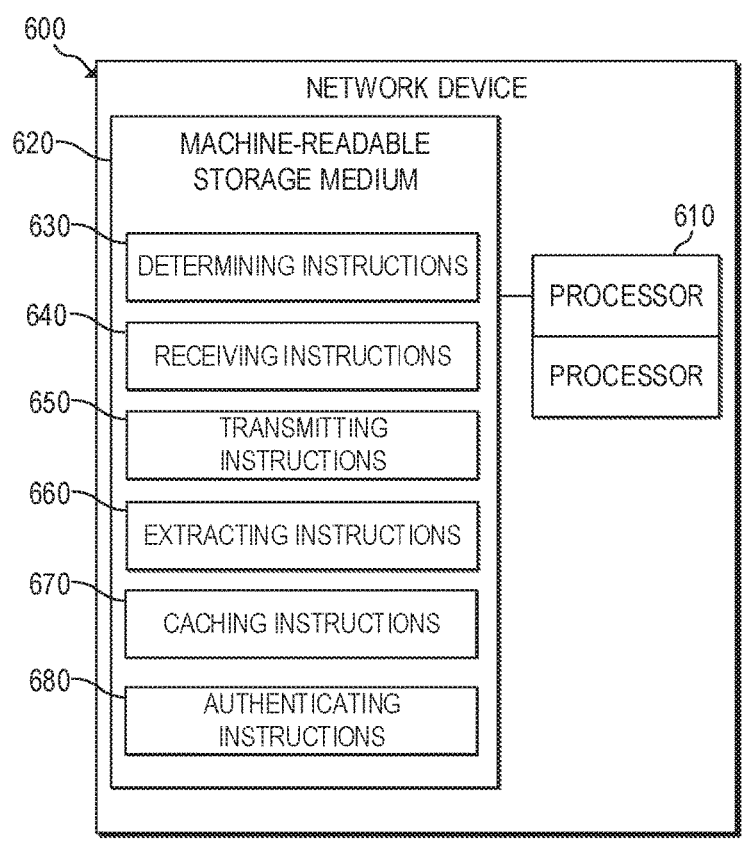
FIG. 6 is a block diagram of an example network device to deauthenticate a client device during an association validation phase based on a plurality of capabilities associated with the client device.

FIG. 6 is a block diagram of an example network device to deauthenticate a client device based on client capabilities. The example network device 600 has at least one processor 610 to execute instructions 630-680 within a machine-readable storage medium 620 to deauthenticate a client device based on client capabilities. Although the network device 600 includes at least one processor 610 and machine-readable storage medium 620, it may also include other components that would be suitable to one skilled in the art. For example, network device 600 may include an additional processing component and/or storage. In another implementation, the networking device (e.g., access points AP1 140 or AP2 145 as in FIG. 1) executes instructions 630-680. Network device 600 is an electronic device with the at least one processor 610 capable of executing instructions 630-680, and as such implementations of network device 600 include a server, data center, networking device, computer, or other type of electronic device capable of executing instructions 630-680. The instructions 630-680 may be implemented as methods, functions, operations, and other processes implemented as machine-readable instructions stored on the storage medium 620, which may be non-transitory, such as hardware storage devices (e.g., random access memory (RAM), read only memory (ROM), erasable programmable ROM, electrically erasable ROM, hard drives, and flash memory).

The at least one processor 610 may fetch, decode, and execute instructions 630-680 to deauthenticate a client device based on client capabilities. Specifically, the at least one processor 610 executes instructions 630-680 to: receive a connection request to connect to a wireless network, the connection request comprising a first association request from a client device; extract a parameter that is specific to the client device from the association request; determine a plurality of capabilities associated with the client device based on a value of the parameter; transmit the plurality of capabilities to an association validation server/authentication server during an association phase prior to an association validation phase; receive an association validation decision corresponding to the connection request from an association validation server/authentication server that compares the plurality of capabilities with a preconfigured wireless network attribute policy to make the association validation decision; deauthenticate the client device during the association validation phase in response to the association validation decision indicating that the client device is denied access to the wireless network; determine a reason for denial based on the received association validation decision; transmit an identifier corresponding to the client device and the reason for denial to a network controller such that the network controller caches the identifier and the reason for a predetermined period of time during which connection requests from the client device are denied by the network device without forwarding to the association validation server/authentication server; forward an authentication request from the client device to the association validation server/authentication server to initiate the association validation phase; cache a client identifier and the reason for denial for a predetermined period of time during which connection requests from the client device are rejected without forwarding to the association validation server/authentication server; etc.

The machine-readable storage medium 620 includes instructions 630-680 for the processor 610 to fetch, decode, and execute. In another example, the machine-readable storage medium 620 may be an electronic, magnetic, optical, memory, storage, flash-drive, or other physical device that contains or stores executable instructions. Thus, the machine-readable storage medium 620 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 620 may include an application and/or firmware which can be utilized independently and/or in conjunction with the at least one processor 610 to fetch, decode, and/or execute instructions of the machine-readable storage medium 620. The application and/or firmware may be stored on the machine-readable storage medium 620 and/or stored on another location of the network device 600.

I claim:

1. A network device comprising:
a memory;
a hardware processor executing instructions from the memory to:
receive a connection request to connect to a wireless network, the connection request comprising a first association request from a client device;
extract a parameter that is specific to the client device from the association request;
determine a plurality of capabilities associated with the client device based on a value of the parameter;
transmit the plurality of capabilities to an authentication server during an association phase prior to an association validation phase;
receive an association validation decision corresponding to the connection request from an authentication server that compares the plurality of capabilities with a preconfigured wireless network attribute policy to make the association validation decision;
deauthenticate the client device during the association validation phase in response to the association validation decision indicating that the client device is denied access to the wireless network;
determine a reason for denial based on the received association validation decision; and
transmit an identifier corresponding to the client device and the reason for denial to a network controller such that the network controller caches the identifier and the reason for a predetermined period of time during which connection requests from the client device are denied by the network device without forwarding to the authentication server.

2. The network device of claim 1, wherein the parameter is extracted from an information element of the association request.

3. The network device of claim 1, wherein the plurality of capabilities comprise the client device's support for fast basic service set (BSS) transition based roaming in the wireless network.

4. The network device of claim 1, wherein the plurality of capabilities comprise the client device's support for assisted roaming based on a neighbor list.

5. The network device of claim 1, wherein the plurality of capabilities comprise the client device's support for beamforming.

6. The network device of claim 1, wherein the association validation decision comprises a reserved reason code indicating a reason for denial of access by the client device to the wireless network.

7. A method comprising:
extracting, by an access point, a parameter that is specific to a client device from a association request received from the client device;
determining, by the access point, a plurality of capabilities associated with the client device based on a value of the parameter;
transmitting the plurality of capabilities to an authentication server during an association phase prior to an association validation phase;
subsequently forwarding an authentication request from the client device to the authentication server to initiate the association validation phase;
receiving an association validation decision based on the plurality of capabilities from the authentication server during the association validation phase;
deauthenticating the client device during the association validation phase in response to the association validation decision indicating that the client device is denied access to the wireless network based on the plurality of capabilities;
determining a reason for denial based on the received association validation decision; and
caching a client identifier and the reason for denial for a predetermined period of time during which connection requests from the client device are rejected without forwarding to the authentication server.

8. The method of claim 7, wherein the plurality of capabilities comprise the client device's support for fast basic service set (BSS) transition based roaming in the wireless network.

9. The method of claim 7, wherein the plurality of capabilities comprise the client device's support for assisted roaming based on a neighbor list.

10. The method of claim 7, wherein the plurality of capabilities comprise the client device's support for beamforming.

11. The method of claim 7, wherein the association validation decision comprises a reserved reason code indicating a reason for denial of access by the client device to the wireless network.

12. A non-transitory machine-readable storage medium encoded with instructions executable by at least one processor of a network device, the machine-readable storage medium comprising instructions to:
extract a parameter that is specific to a client device from a association request received from the client device;
determine a plurality of capabilities associated with the client device based on a value of the parameter;
transmit the plurality of capabilities to an authentication server during an association phase;
receive an association validation decision based on the plurality of capabilities from the authentication server during an association validation phase subsequent to the association phase;
deauthenticate the client device during the association validation phase in response to the association validation decision indicating that the client device is denied access to the wireless network based on the plurality of capabilities;
determine a reason for denial based on the received association validation decision; and cache a client identifier and the reason for denial for a predetermined period of time during which connection requests from the client device are rejected without forwarding to the authentication server.

* * * * *